United States Patent [19]
Bates et al.

[11] Patent Number: 5,533,182
[45] Date of Patent: Jul. 2, 1996

[54] AURAL POSITION INDICATING MECHANISM FOR VIEWABLE OBJECTS

[75] Inventors: Cary L. Bates; Brian J. Cragun; Robert J. Donovan, all of Rochester; William Jaaskelainen, Oronoco; Jeffrey M. Ryan, Byron; Bryan L. Striemer, Zumbrota, all of Minn.

[73] Assignee: International Business Machines Corporation, Armonk, N.Y.

[21] Appl. No.: 995,473

[22] Filed: Dec. 22, 1992

[51] Int. Cl.⁶ .............................. G06F 3/00; G06F 3/16
[52] U.S. Cl. .................... 395/155; 395/157; 395/154; 345/145
[58] Field of Search .................... 395/155, 157, 395/154, 159; 345/119, 123, 145; 340/825.19; 434/116

[56] References Cited

U.S. PATENT DOCUMENTS

| | | | |
|---|---|---|---|
| 5,016,003 | 5/1991 | Rice, Jr. et al. | 340/825.19 |
| 5,033,969 | 7/1991 | Kamimura | 395/155 X |
| 5,186,629 | 2/1993 | Rohen | 345/119 X |
| 5,208,745 | 5/1993 | Quentin et al. | 395/154 X |
| 5,223,828 | 6/1993 | McKiel, Jr. | 340/825.19 |
| 5,287,102 | 2/1994 | McKiel, Jr. | 434/116 X |
| 5,339,391 | 8/1994 | Wroblewski et al. | 395/157 |
| 5,371,846 | 12/1994 | Bates | 395/157 |
| 5,374,924 | 12/1994 | McKiel, Jr. | 340/825.19 |

OTHER PUBLICATIONS

Microsoft Windows User's guide, Version 3.0, Microsoft Corporation, 1990, pp. 80–84.
DA991–031, Ser. No. 07/802,956, Method and system For Enabling Blind or Visually Impaired Computer Users to Graphically Select Displayed Elements.
DA991–033, Ser. No. 07/746,840, Audio User Interface With Stereo And Filtered Sound Effects.

*Primary Examiner*—Raymond J. Bayerl
*Attorney, Agent, or Firm*—Steven W. Roth

[57] ABSTRACT

Three separate methods are used to provide the user with sounds that help the user understand where a particular current position is relative to a "location of interest" (LOI) within the viewable object. First, the user is able to use sound marks to mark specific LOIs within viewable objects so that the user may return to those LOIs at a later time. Second, the user is provided with view regions which aurally indicate the LOS of frequeuntly used portions of the viewable object. Lastly, the user is given an aural indication of the current position of the position identifier relative to the viewable object as a whole. This is called relational positioning. Each type of aural LOI indication can be presented to the user regardless of how the user is moving through the viewable object.

28 Claims, 17 Drawing Sheets

200

202

Twas the night before Christmas and all through the house not a creature was stirring, not even a mouse

204

The stockings were hung by the chimney with care in hopes that Saint Nicholas soon would be there

206

And Mama in her kerchief and I in my cap had just settled down for a long winter's nap,
.........

FIG. 2A

```
Browse Settings for (----------)                379

Scroll Orientation ___ REL.  ___ REG.  ——395
Cursor Orientation ___ REL.  ___ REG.  ——396
Scroll Bar Loc. Ind. Type      _____ ——392
Cursor Loc. Ind. Type          _____ ——398
Volume Factor                  _____ ——399
Primary Audio Characteristic   _____ ——393
Secondary Audio Characteristic _____ ——391
Extent Factor                  _____ ——389
Reduction Factor               _____ ——387
Sampling Period                _____ ——385
First Record Pitch Value       _____ ——383
Second Record Pitch Value      _____ ——381
```

FIG. 3C

```
                    301
Current Position  ——303
Event Type        ——305
Position Finder   ——307
```

FIG. 3D

Sound Processor

Sound Processor

Sound Processor

Relative Positional Sound Generator

Scroll Processor

AURAL POSITION INDICATING MECHANISM FOR VIEWABLE OBJECTS

FIELD OF THE INVENTION

This invention relates to the data processing field. More specifically, this invention relates to position notification within viewable objects.

BACKGROUND OF THE INVENTION

The recent proliferation of secondary storage devices has made it possible to store mass amounts of information on computer systems. Information that resides on any given computer system may include user documents which change over time and more static information such as encyclopedias and dictionaries. The ability to gain access to such a large amount of information coupled with the multiple view capability provided by today's user interfaces (i.e., window generating applications) allows computer system users to view viewable objects which are extremely large in size and to view and/or edit multiple viewable objects simultaneously. The extreme size of today's viewable object often leaves users wondering where they are and where they have been within even a single viewable object. This problem is exacerbated when the user needs information from several viewable object at the same time.

For example, a user may be viewing a document which is in the process of being written when he or she decides to incorporate a line from a famous poem. Since the computer system has the text of the poem stored in secondary storage (most likely on an optical storage device), the user simply accesses the work, selects the appropriate text, and incorporates that text into the document. But this power is not limited to two viewable objects. In the process of writing the document, the user may need more and more information (e.g., a dictionary to define a term or an encyclopedia to include explanatory text).

After a while, there may be several viewable objects being presented to the user at the same time. At some point, there is so much information being represented in so many windows that it becomes impossible for the user to determine what view is currently being presented for what object. This, of course, causes the user a great deal of consternation. The user ends up "fishing around" in each viewable object trying to find where they were and where they want to go.

One contemporary attempt at solving this problem is the use of "book marks." Much like the common use of a slip of paper to mark a particular place in a book, the computer styled book mark is a visual representation of a particular location within a viewable object. A user can place the book mark at a particular location and then return to that location by accessing the book mark. Book mark facilities have two serious short comings. First, book marks, as visual representations of location, are effective only when they can be seen by the user. When several views of viewable objects are being simultaneously presented to the user, the windows used will invariably overlap. Since book mark facilities depend upon the user being able to see the outer portion of the window that contains the viewable object, the user is often unable to see and, therefore, use the book mark. This problem is especially acute when one considers the needs of visually impaired computer users.

The second shortcoming of book mark facilities is that they depend upon user intervention to accomplish their function. If the user does not mark a position within the viewable object, no location information is available to the user. Book mark implementations provide no way for the user to determine where they are relative to the whole viewable object (i.e., relative to the top and the bottom) or where they are relative to frequently used portions of the viewable object. Scroll bar facilities do provide an indication of where the user is relative to the whole of the viewable object, but they too depend upon visual representations. As mentioned above, this leads to user confusion when windows overlap and is totally unworkable for the visually impaired computer user.

SUMMARY OF THE INVENTION

It is a principal object of this invention to provide an enhanced method and apparatus for providing a computer user with an aural indication of position within a viewable object.

It is another object of this invention to provide an enhanced method and apparatus for providing a computer user with view regions which generate an aural indication of the location of frequently viewed portions of a viewable object.

It is yet another object of this invention to provide an enhanced method and apparatus for dynamically adjusting the size of view regions to reflect the degree to which they are viewed by the computer system user.

It is still another object of this invention to provide an enhanced method and apparatus for providing a computer user with the ability to create sound marks within a viewable object that provide an aural indication of position within that viewable object.

It is still another object of this invention to provide an enhanced method and apparatus for providing computer users with an aural indication of a current position of a position identifier relative to the whole of the viewable object.

The present invention gives a computer system user the ability to identify locations of interest within a viewable object through the use of sound. At the outset, it is important to understand the nomenclature used throughout this specification. "Viewable" object should be taken to mean an object that is capable of being presented to a user, be it an object that is capable of being modified or an object that can only be looked at. "Current position" should be taken to mean the current position within a viewable object of a "position identifier." Position identifiers are used to select different views within a viewable object. As such, the user is moving the position identifier a large amount of the time. "Position identifier" should also be taken to be a generic representation of either a cursor or a slider (an example slider is shown in FIGS. 2B and 2C). A "location of interest" (LOI) should be taken to mean a location, other than the current position, within the viewable object that is of particular interest to the user. This LOI may be fixed or it may slowly migrate over time. However, it will not change as often or to the degree that the current position changes. It is important to understand the distinction between a current position and an LOI since most of the specification describes where a current position is relative to an LOI.

Other important terminology is the use of the words "sound" and "intensity." The word "sound" should be taken to generically refer to any type of sound. Hence, a reference to "sound" could be a beep, a buzz, a prerecorded or synthesized voice, or any other type of noise. While the preferred embodiment is described in terms of changes to sound intensity (i.e., volume), those skilled in the art will appreciate that the present invention applies equally to any sound change (e.g., pitch).

The present invention uses three separate methods to provide the user with sounds that help the user understand where a particular current position is relative to an LOI within the viewable object. First, the user is able to use sound marks to mark specific LOIs within viewable objects so that the user may return to those LOIs at a later time. Second, the user is provided with view regions which aurally indicate the LOI of frequently used portions of the viewable object. Lastly, the user is given an aural indication of the current position of the position identifier relative to the viewable object as a whole. This is called relational positioning. Each type of aural LOI indication can be presented to the user regardless of how the user is moving through the viewable object (i.e., regardless of how the position identifier is moved). However, sound marks and view regions are grouped into a category called locational orientation, while relational positioning is a separate category called relational orientation. Since allowing a user to select locational orientation and relational orientation simultaneously would increase rather than reduce confusion, the present invention allows the user to select only a single orientation per method of position identifier movement (i.e., one orientation for cursor movement and one orientation for slider movement).

To create a sound mark, the computer user moves the position identifier to the desired LOI. Then, a keystroke or graphical pointing device is used to specifically identify the LOI. As the user moves the position identifier away from the sound mark, he or she will hear a sound that diminishes in intensity as the distance from the sound mark increases. When the position identifier position is moved outside of a sound area defined for that sound mark, the sound ceases all together. When the user moves the position identifier back into the sound area, the user will hear a sound that increases in intensity as the position identifier approaches the sound mark.

View regions are dynamically created and adjusted based upon the degree to which portions of the document are viewed by the user. If the user spends a great deal of time viewing a particular portion of the document, a view region will be dynamically created for that portion of the document. If the user continually returns to that portion of the document, the view region area (VRA) that is associated with that particular view region is dynamically expanded; whereas, infrequent viewing of that portion of the viewable object will result in the decrease of the size of the subject VRA and, eventually, deletion of the view region all together. The view region is dynamically adjusted to remain in the center of its VRA.

A user who elects to be told where the position identifier is relative to the whole of the viewable object will hear a sound that increases in intensity as the position identifier is moved closer to the ends of the viewable object and diminishes in intensity as the position identifier is moved towards the middle of the viewable object.

BRIEF DESCRIPTION OF THE DRAWINGS

FIGS. 2A through 2C show various views of the example viewable object that will be used through out this specification to explain the present invention.

FIG. 3C is the user interface used to set default values for the various global parameters used in the preferred embodiment.

FIG. 3D is a block diagram that shows a portion of the window event of the preferred embodiment.

DESCRIPTION OF THE PREFERRED EMBODIMENT

Figure 1:
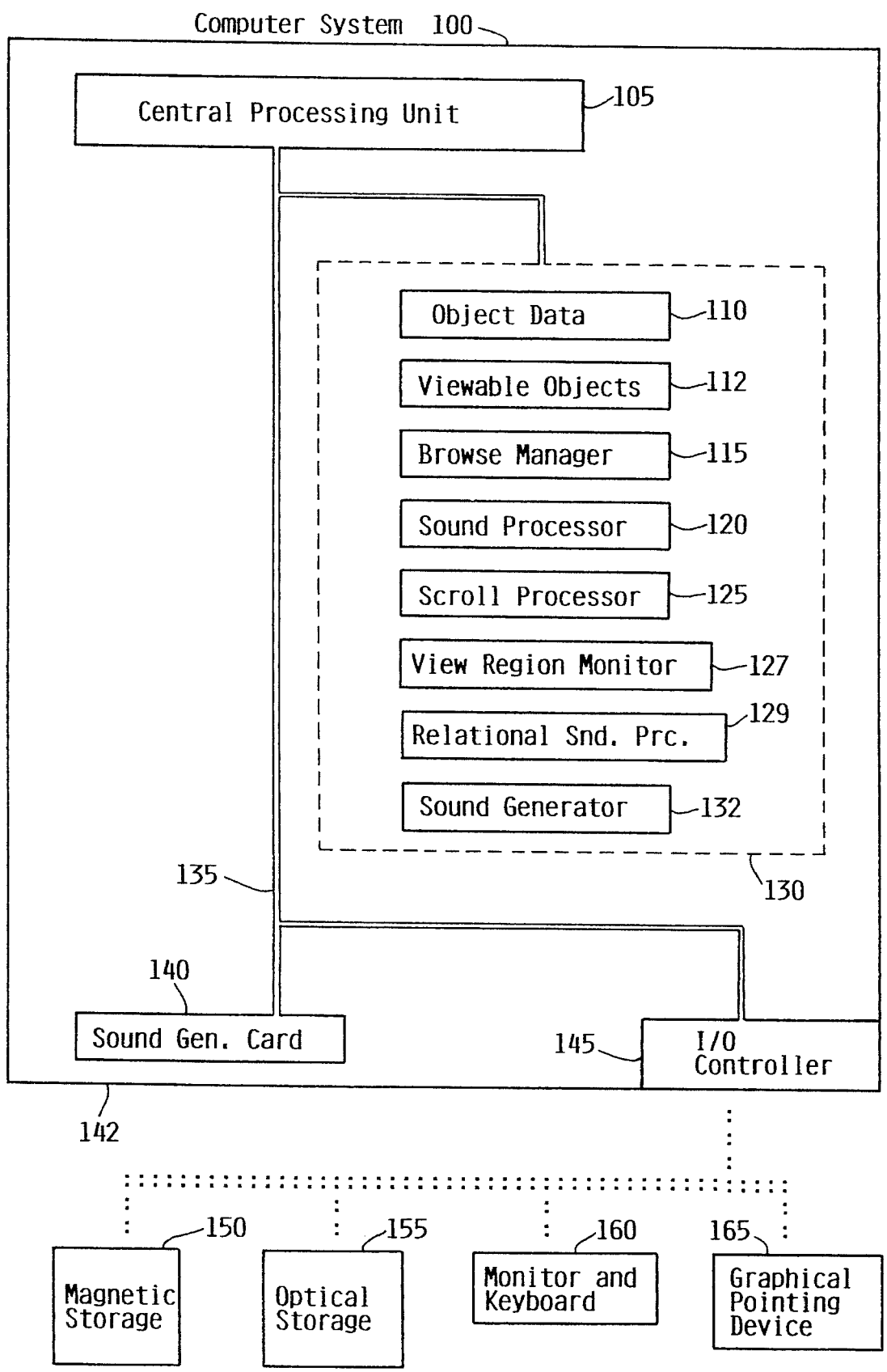
FIG. 1 shows the computer system of the present invention.

FIG. 1 shows a block diagram of the computer system of the present invention. The computer system of the preferred embodiment is an IBM Personal System/2 model 80. However, any computer system could be used. FIG. 1 shows an exploded view of computer system 100. Computer system 100 comprises main or central processing unit (CPU) 105, primary storage 130, sound generator card 140 and I/O controller 145, all of which are inner connected via bus 135. Although bus 135 of the preferred embodiment is a conventional hardwired, multidrop bus, any connection means that supports bi-directional communication could be used.

Sound generator card 140 and speaker 142 are used by computer system 100 to emit various sounds to the user. In the preferred embodiment, sound generator card 140 is an IBM M-Audio Capture and Playback Adapter; however, the present invention applies equally to any sound generator card that can, like the IBM M-Audio Capture and Playback Adapter, emit multiple sounds as well as those sound generator cards which can emit only a single sound.

Primary storage 130 contains object data 110, viewable objects 112, browse manager 115, sound processor 120, scroll processor 125, view region monitor 127, relational sound processor 129, and sound generator 132. While each of these entities are shown to reside in primary storage 130, it will be recognized by those skilled in the art that they may at times reside in magnetic storage 150 or optical storage 155. For example, while viewable objects 112 will typically be loaded into primary storage 130 when being accessed by browse manager 115, they will most likely reside on magnetic storage 150 or optical storage 155 when they are not being used.

Connected to I/O controller 145 are magnetic storage 150, optical storage 155, monitor and keyboard 160, and graphical pointing device 165. As stated, magnetic storage 150 and optical storage 155 are used to house viewable objects that are not currently being accessed by browse manager 115 or some other active program. Because of the faster write time of magnetic media, magnetic storage device 150 will typically be used to house viewable objects that change over time, while static viewable objects will typically be housed on the less expensive optical media (i.e., optical storage device 155). Monitor and keyboard 160 are used to communicate with computer system 100 and graphical pointing device 165 is used to move position identifiers about viewable objects. While the graphical pointing device of the present invention is a mouse, any type graphical pointing device could be used.

FIG. 2A shows the example viewable object that is used throughout this specification to explain the present invention. As shown, viewable object 200 represents the famous children's poem written by Clement C. Moore in the early 1800s. Also shown on FIG. 2A are views 202, 204, and 206. Views 202, 204, and 206 can be thought of as portholes into viewable object 200. Each view represents what a user would be presented at different places within viewable object 200. Since in most cases the user cannot view an entire viewable object at the same time, it is helpful to receive an aural indication of the current position of the position identifier relative to a user specified LOI within the viewable object, a frequently viewed LOI within the document, or to the viewable object as a whole.

The sound mark, view region, and relative positional sound facilities of the present invention provide such capability. For example, assume that the position identifier is currently positioned so that view 202 is being presented to the user. Further assume that the user has created a sound mark in view 204. If the position identifier is moved toward view 204, the user will begin to hear a sound. As the position identifier gets closer to the point specified by the sound mark, the sound will increase in intensity. Hence, the user will know that they are getting closer to the sound mark that they set up. If the user moves the position identifier toward view 206 (i.e., past the sound mark), the user will hear the sound decrease in intensity and thereby realize that the position identifier is moving away from the sound mark. A detailed explanation of how sound marks are utilized and created is provided by FIG. 2B, FIGS. 3A–4, FIG. 6, FIGS. 7A and 7B, and the accompanying text.

View regions can be explained with a similar example. Assume that for some reason the user of computer system 100 is particularly interested in the text shown in view 206, and accordingly, spends a significant amount of time viewing that portion of viewable object 200. Browse manager 115, sound processor 120, and view region monitor 127 will work in conjunction to automatically create and dynamically adjust an appropriate view region. If the position identifier is moved from view 204 toward view 206, the user will begin to hear a sound. As the position identifier gets closer to the view region created in view 206, the sound will increase in intensity. Hence, the user will know that they are getting closer to a frequently viewed portion of viewable object 200. As the user moves the position identifier past the center of the view region (i.e., toward view 206), the sound will decrease in intensity and the user will thereby realize that the position identifier is moving away from the center of the view region. A detailed explanation of how view regions are automatically created and dynamically adjusted is provided by FIG. 2C, FIGS. 3A–4, FIGS. 6–7B, and the accompanying text.

Lastly, a user can use the relational positioning facility of the present invention to be informed of the current position of the position identifier relative to the viewable object as a whole. In this situation, the user will hear a sound that changes in intensity to point out where the position identifier is relative to the ends of viewable object 200. A detailed explanation of relational positioning is provided by FIGS. 3A–5, and the accompanying text.

Figure 2B:
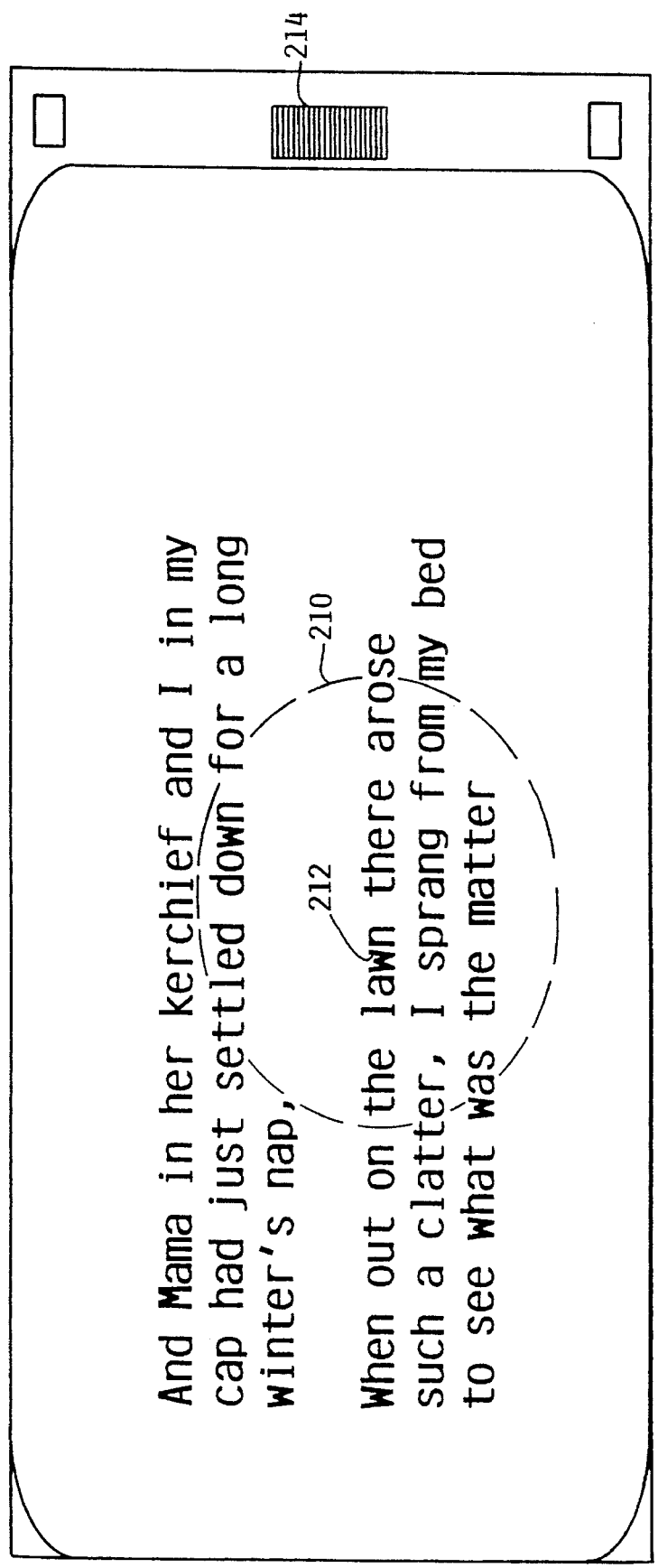

FIG. 2B shows the sound mark area (SMA) used in the present invention. SMA 210 is automatically created when a user creates a sound mark (e.g., sound mark 212). In the preferred embodiment, sound mark 212 is created when a user "triple clicks" on the left button of graphical pointing device 165. However, it will be understood by those skilled in the art that there are a plethora of ways in which a particular LOI in a viewable object can be specified. Sound mark region 210 defines the region in which sound will be emitted for the subject sound mark (here, sound mark 212). It will be further understood by those skilled in the art that while the sound mark of the preferred embodiment is representative of a particular point, geometric shape which circumscribe more area that a point could be used (e.g., circles, squares, rectangles, triangles, etc. ). When the position identifier initially tracks across SMA 210, the sound is emitted at a pre-defined minimal intensity. As the position identifier approaches sound mark 212, the intensity of the emitted sound increases until the position identifier is on top of the sound mark. At that point, a pre-defined maximal intensity is emitted. As the position identifier is moved away from the sound mark, the sound diminishes in intensity. The sound is terminated completely when the position identifier passes out of SMA 210. As mentioned, a position identifier could be a cursor or a slider such as slider 214.

Figure 2C:
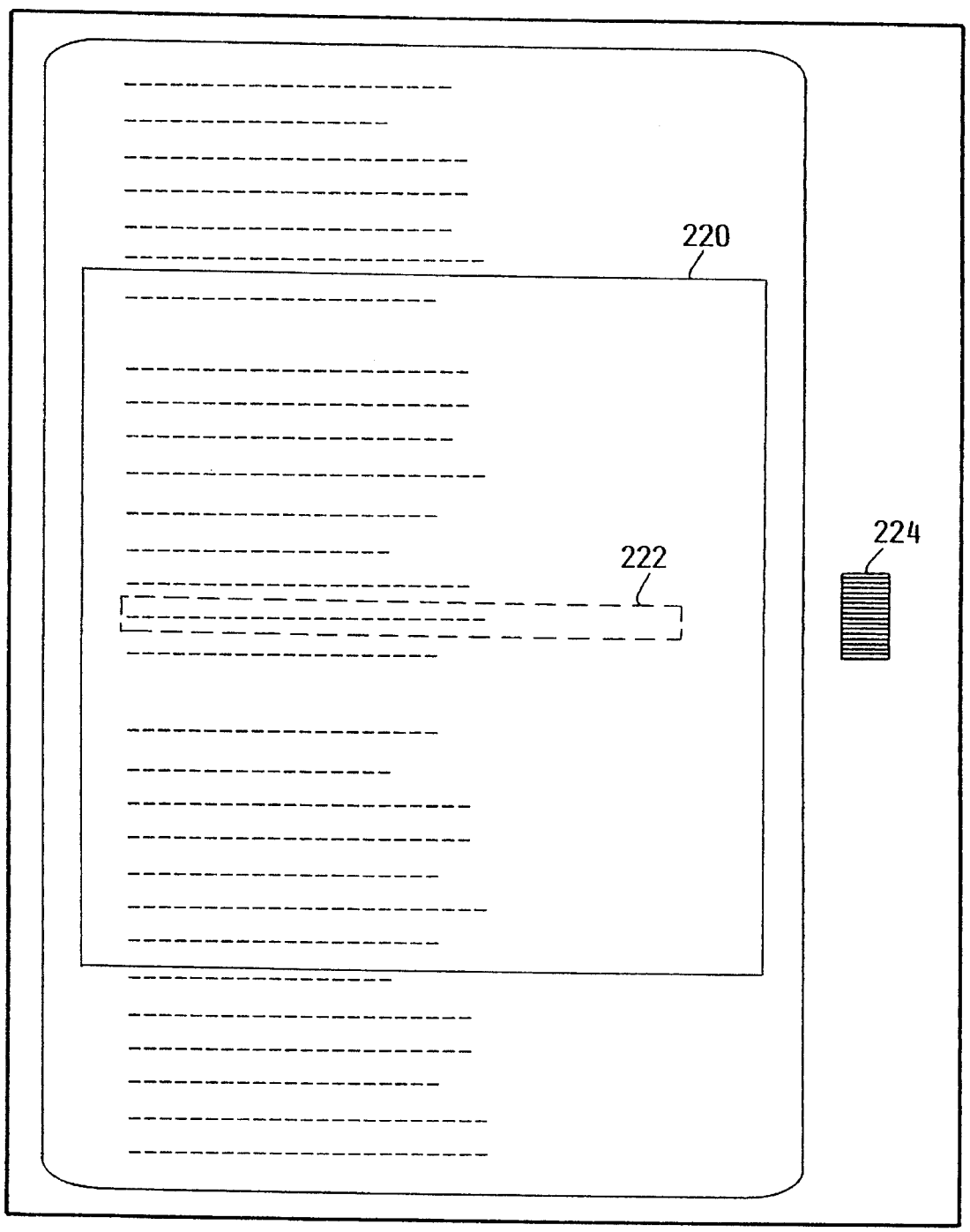

FIG. 2C shows the view region area (VRA) used in the present invention. VRA 220, like view region 222 is automatically created when a user spends a predetermined amount of time viewing that particular portion of the viewable object. Much like SMA 210 of FIG. 2B, VRA 220 defines the region in which sound will be emitted for the subject view region (here, view region 222). When the position identifier initially tracks across VRA 220, the sound is emitted at a pre-defined minimal intensity. As the position identifier approaches view region 222, the intensity of the emitted sound increases until the position identifier is within view region 222. At that point, a pre-defined maximal intensity is emitted. As the position identifier is moved out of view region 222 and toward the area delineated by VRA 220, the sound diminishes in intensity. The sound is terminated completely when the position identifier passes out of VRA 220. A detailed explanation of how VRAs are automatically created and dynamically adjusted is provided by FIG. 8 and the accompanying text.

Figures 1, 3A:
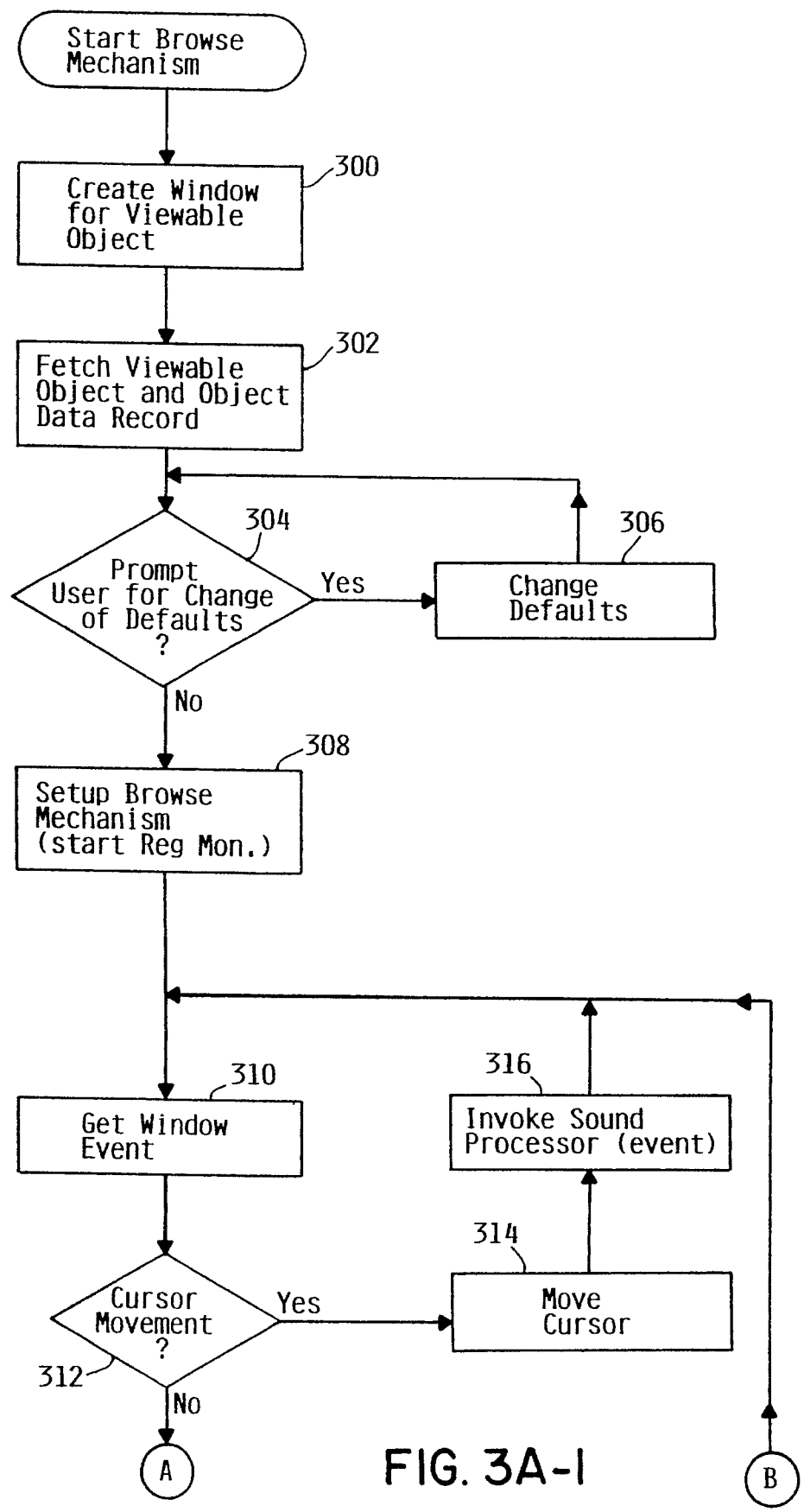
FIG. 3A is a flow diagram that shows the inner working of the browse manager of the preferred embodiment.
Figures 2, 3A:
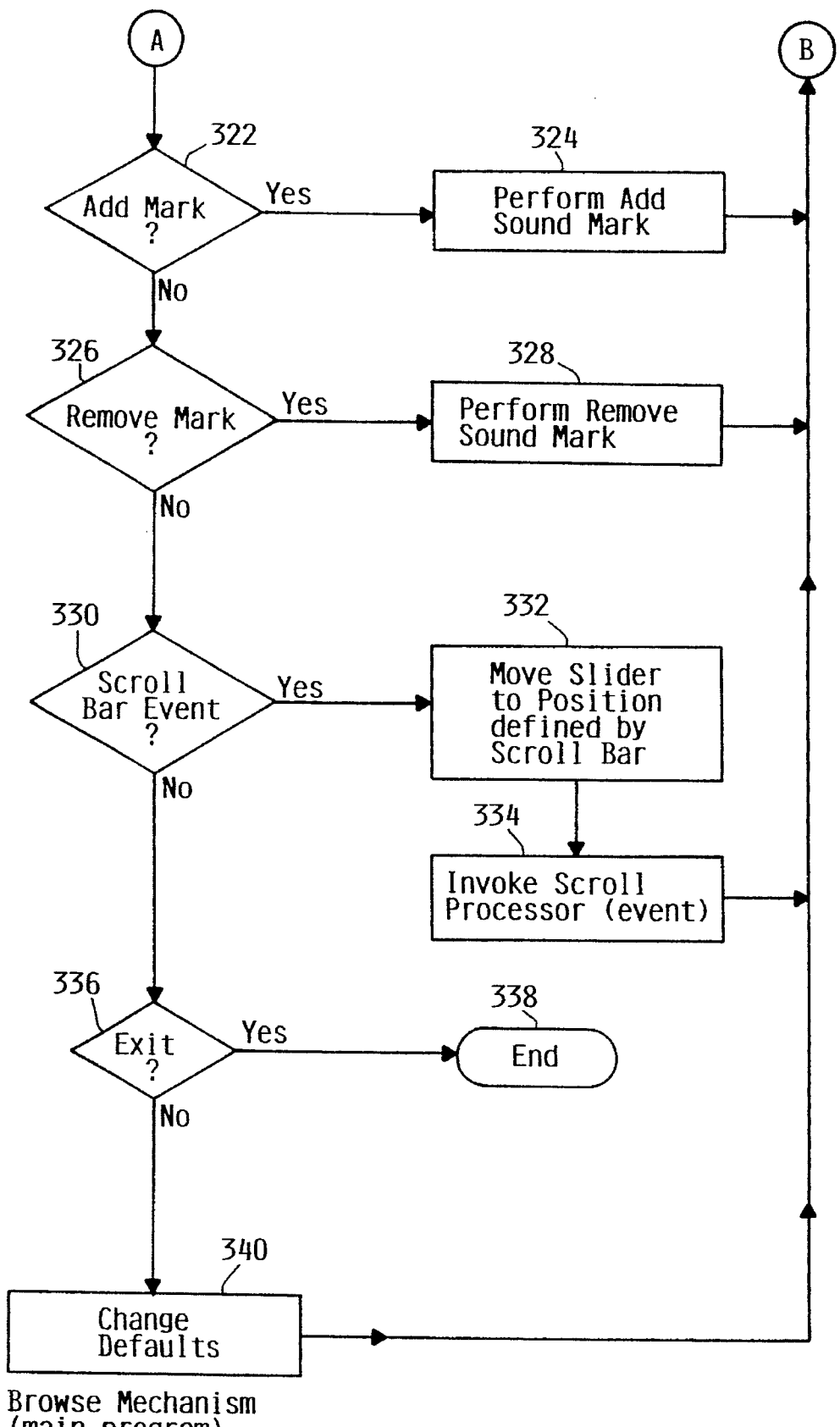

FIG. 3A shows the inner workings of browse manager 115. When a user selects a particular viewable object for viewing, his or her actions cause browse manager 115 to be invoked. As is understood by those skilled in the art, there are many ways in which the selection of a viewable object results in the invocation of a window oriented tool. Therefore, details of this process are not described here. As the governing mechanism of the present invention, browse manager 115 is responsible for initializing the particular window and sending window events to the correct processing mechanism. Browse mechanism 115 begins in block 300 by creating a window for use with the selected viewable object. When the window has been created, browse manager 115 fetches the selected viewable object and an associated object data record 302. Each viewable object of the present invention has a single object data record associated with it. For the purposes of this explanation, assume that the user has selected the viewable object that represents the famous children's poem of Clement C. Moore (See FIGS. 2A–2C).

Figure 3B:
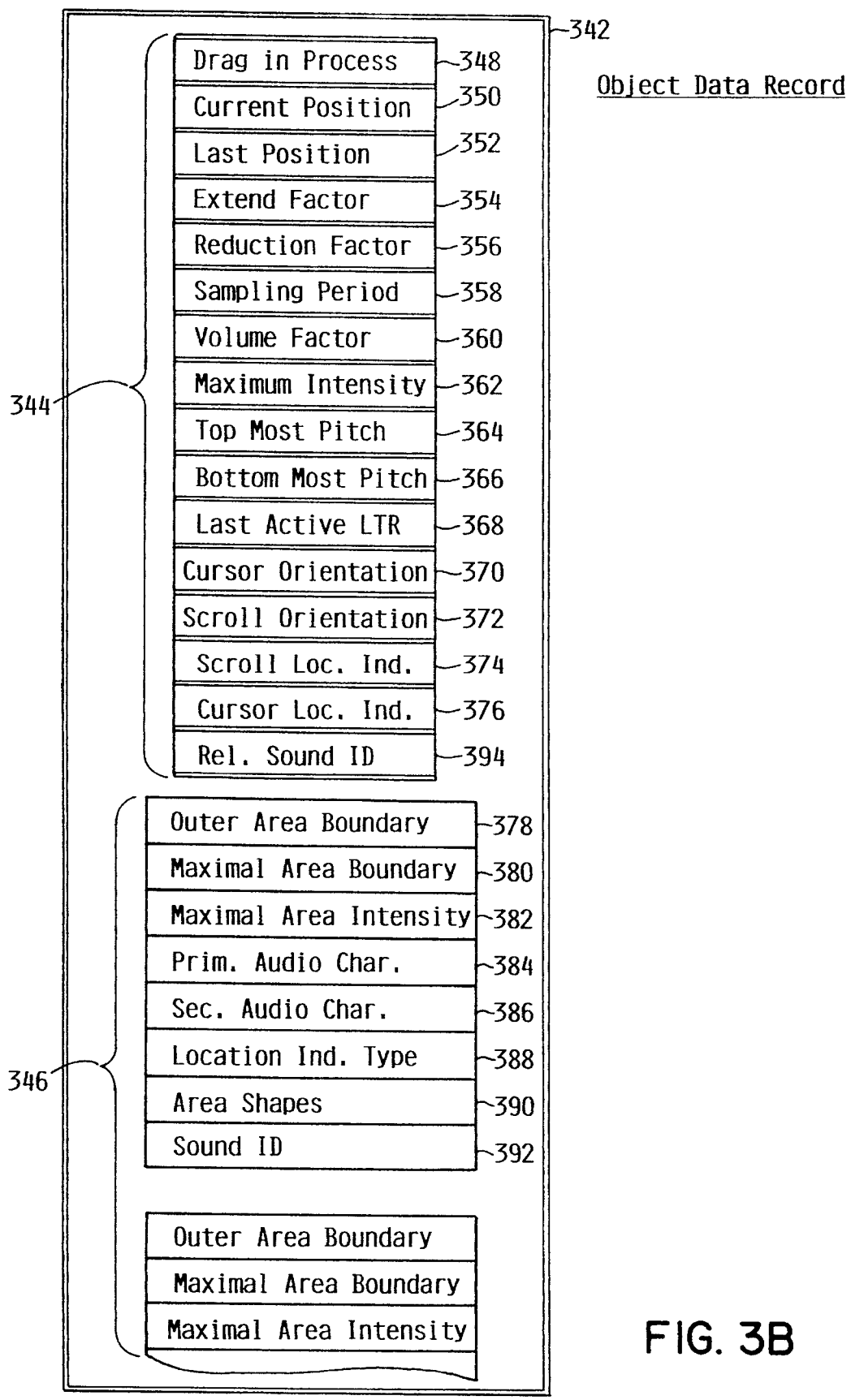
FIG. 3B is a block diagram that shows the primary data structure used in the preferred embodiment.

FIG. 3B shows the format of the object data record of the preferred embodiment. Object data record 342 comprises global parameters 344 and location indicator records (LIRs) 346. Initially, global parameters 344 contain default values for each field shown on FIG. 3B. The use of each of these fields will be explained in detail in the text associated with the forthcoming figures. LIRs 346 each represent either a sound mark or a view region which exists in the viewable object. Of course, initially there would be no sound records present in object data record 342 since the user has not yet had access to viewable object 200—LIRs 346 are shown on FIG. 3B to facilitate the later explanation of these constructs. The use and individual fields of LIRs 346 will be explained in detail in the text associated with the forthcoming figures.

Once browse manager 115 has fetched viewable object 200 and the associated object data record (i.e., object data record 342), browse manager 115 asks the user whether they would like to modify the default values associated with viewable object 200 (block 304). If the user answers "YES," browse manager 115 presents a table to the user so that these default values can be changed 306. FIG. 3C shows value modification table 379 of the preferred embodiment. When a user modifies an entry in modification table 379, browse manager 115 causes the associated field in object data record 342 to be updated.

Once the user has modified the appropriate values, browse manager 115 proceeds to complete its internal initialization 308. Amongst other things, this initialization includes the creation of the scroll bar and slider on the newly created window and the startup of view region monitor 127.

At this point, the user has access to viewable object 200 and can begin to move through it. Whenever the user performs an operation within or upon viewable object 200, be it the movement of a position identifier (i.e., a cursor or a slider), the addition or deletion of a sound mark, or a request to update default parameters; a window event is received by browse manager 115 (block 310). As mentioned, a cursor movement can be caused by a keystroke, a page movement or through the use of a graphical pointing device. Assume for the purposes of this explanation that the user who is looking at viewable object 200 causes a cursor movement to occur. Browse manager 115 detects this type of window event in block 312, moves the cursor appropriately 314, and invokes sound processor 120 (block 316). The parameter passed to sound processor 120 is the window event itself.

FIG. 3D shows a portion of the window event of the preferred embodiment. Window event portion 301 comprises current position 303, event type 305, and position finder field 307. Current position 303 contains the current position of the position indicator (the cursor in this case), event type 305 contains the type of window event (cursor movement event in this case). Position finder field 307 is important for relational positioning and will be explained in connection with FIG. 5.

Figure 4A:
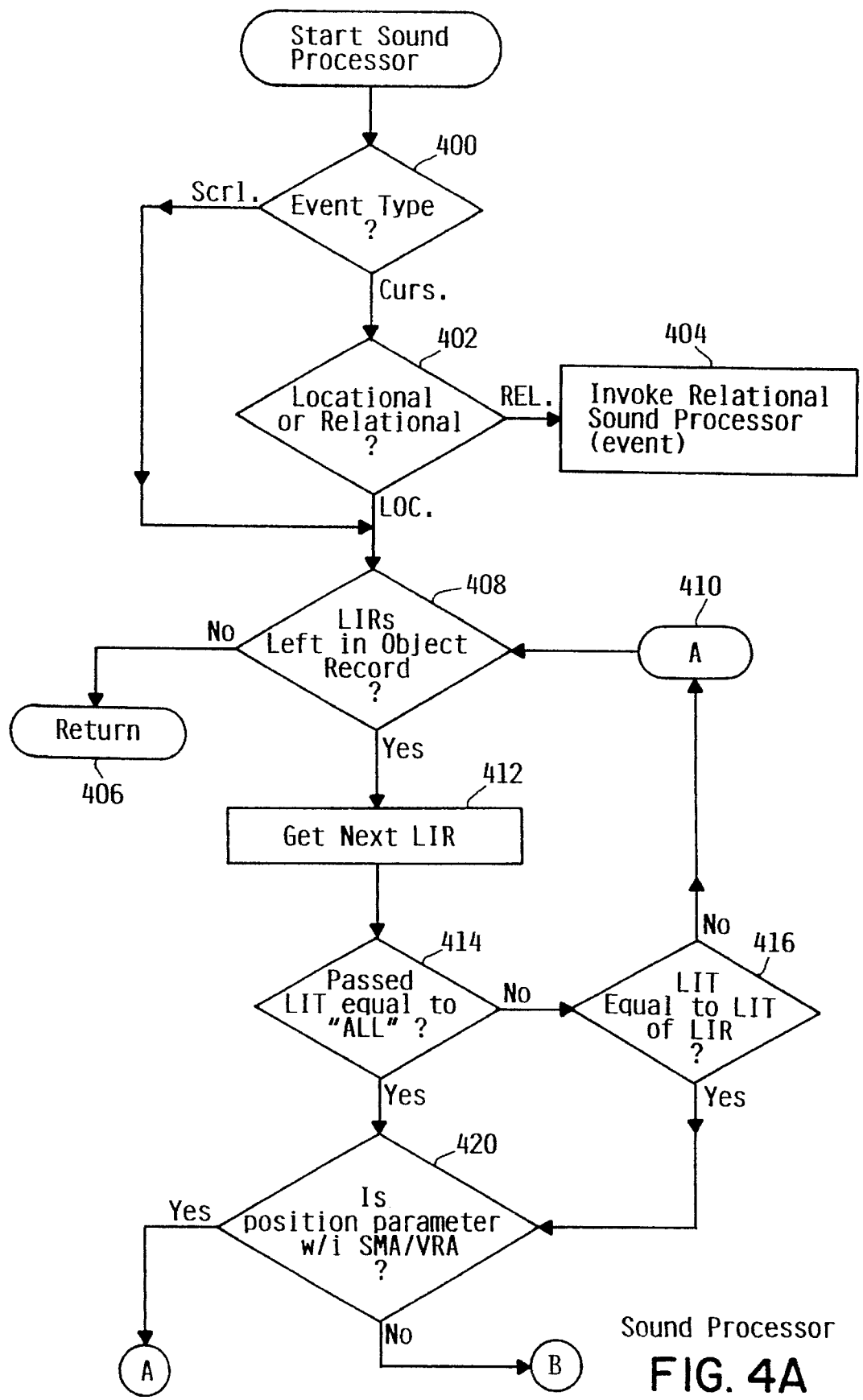
FIG. 4 is a flow diagram that shows the inner workings of the sound processor of the preferred embodiment.
Figure 4B:
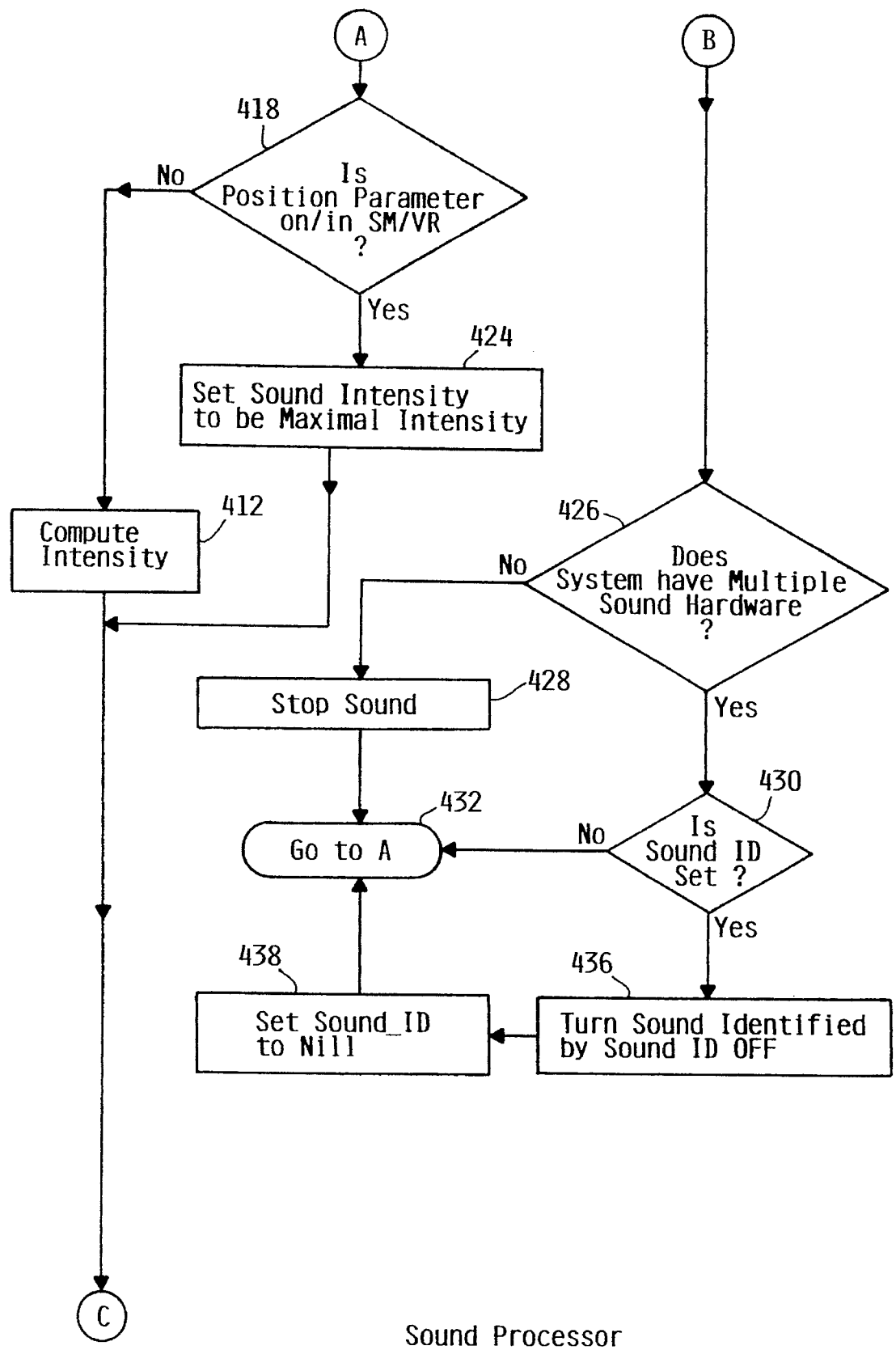
Figure 4C:
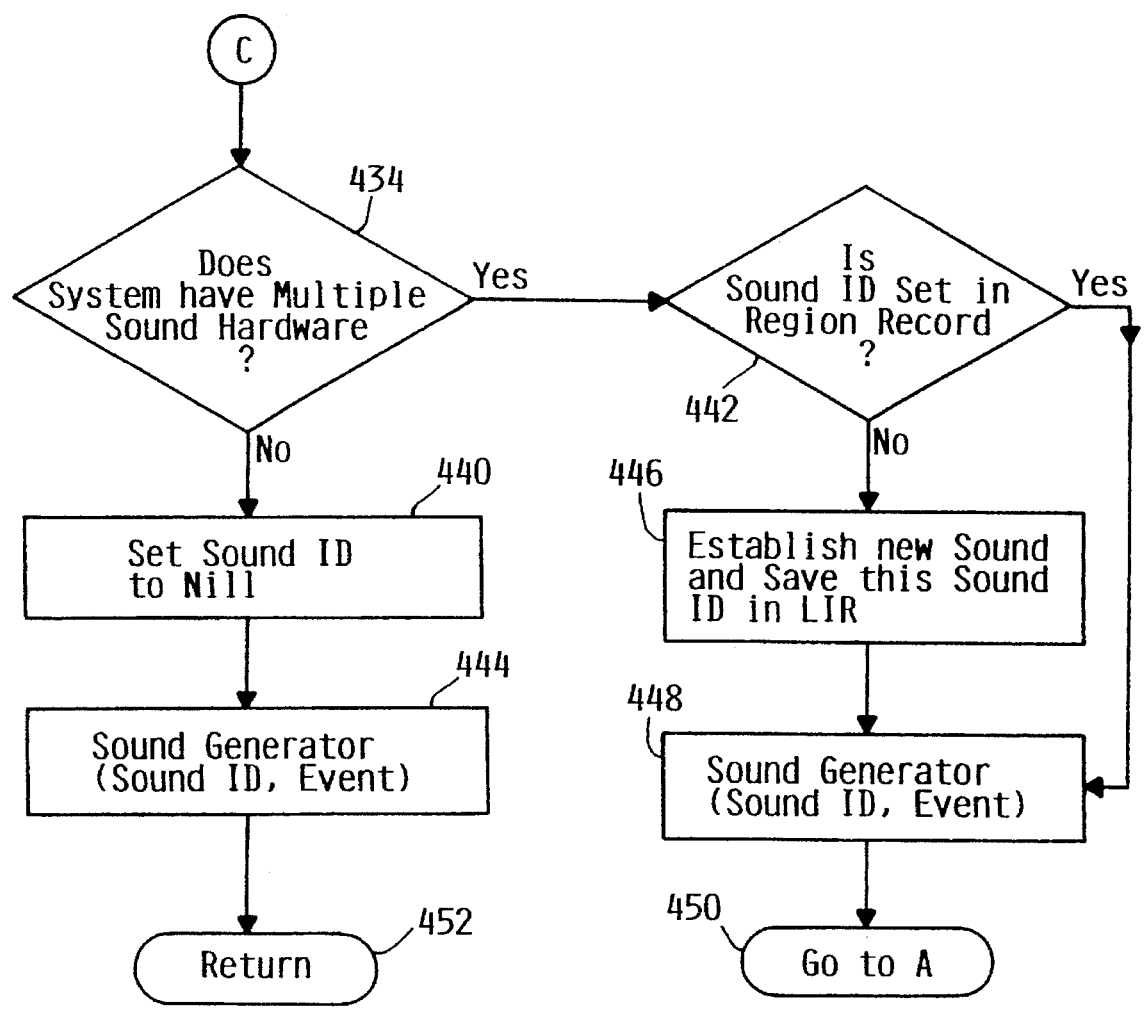

FIG. 4 shows the inner workings of sound processor 120. Sound processor 120 first determines what type of window event it is dealing with 400. In this case the window event is a cursor movement. Sound processor 120 then determines whether the user has elected locational or relational orientation. Sound processor 120 determines this through the use of cursor orientation field 370 of object data record 342 (as shown on FIG. 3B). The user selects the desired orientation through cursor orientation field 398 of modification table 379 (as shown on FIG. 3C). If the user has selected relational orientation for cursor position changes, sound processor 120 will invoke relational sound processor (RSP) 129 (block 404) so that the user will receive an aural indication of the current cursor position as it relates to the viewable object as a whole.

Figure 5A:
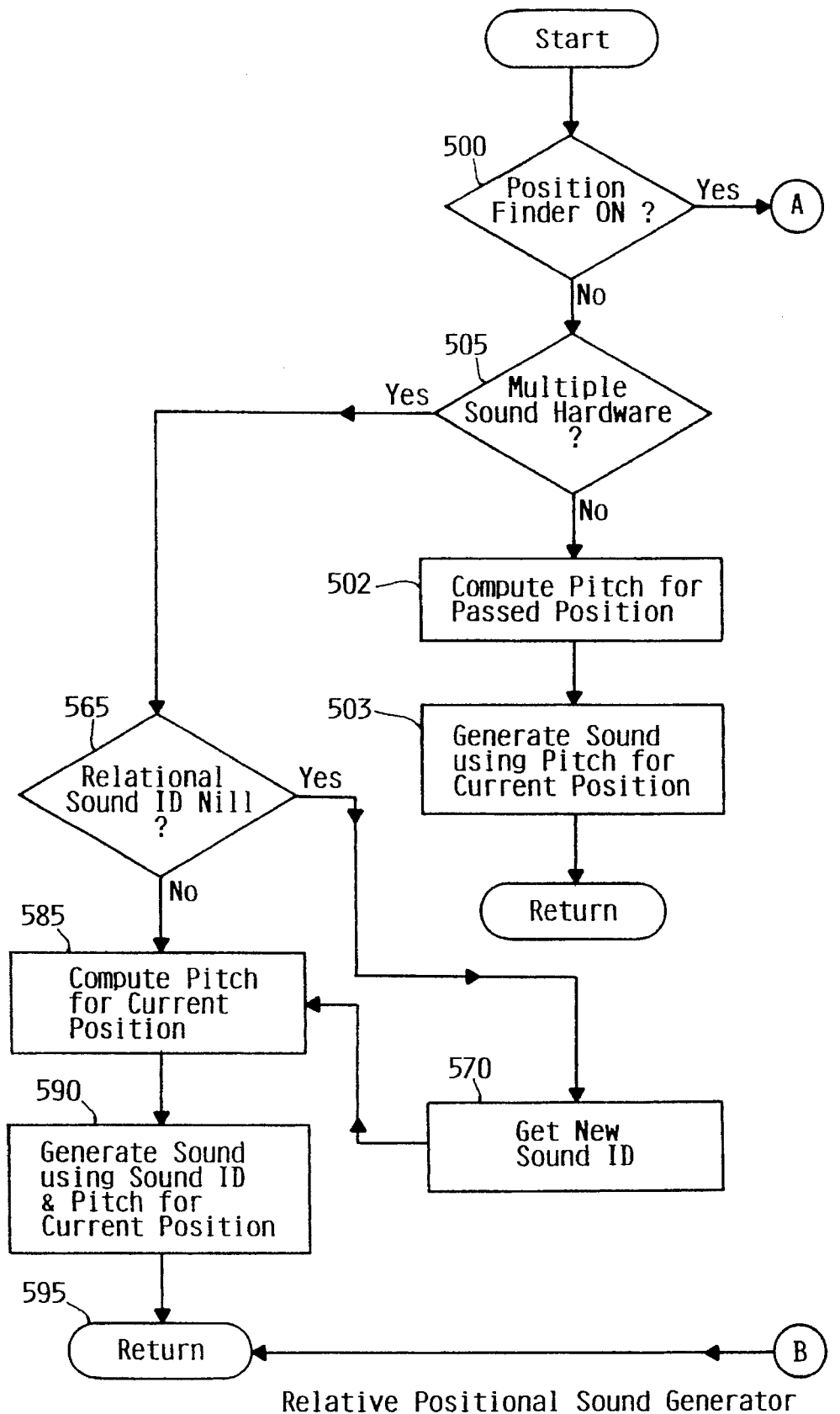
FIG. 5 is a flow diagram that shows the inner workings of the relative positional sound processor of the preferred embodiment.
Figure 5B:
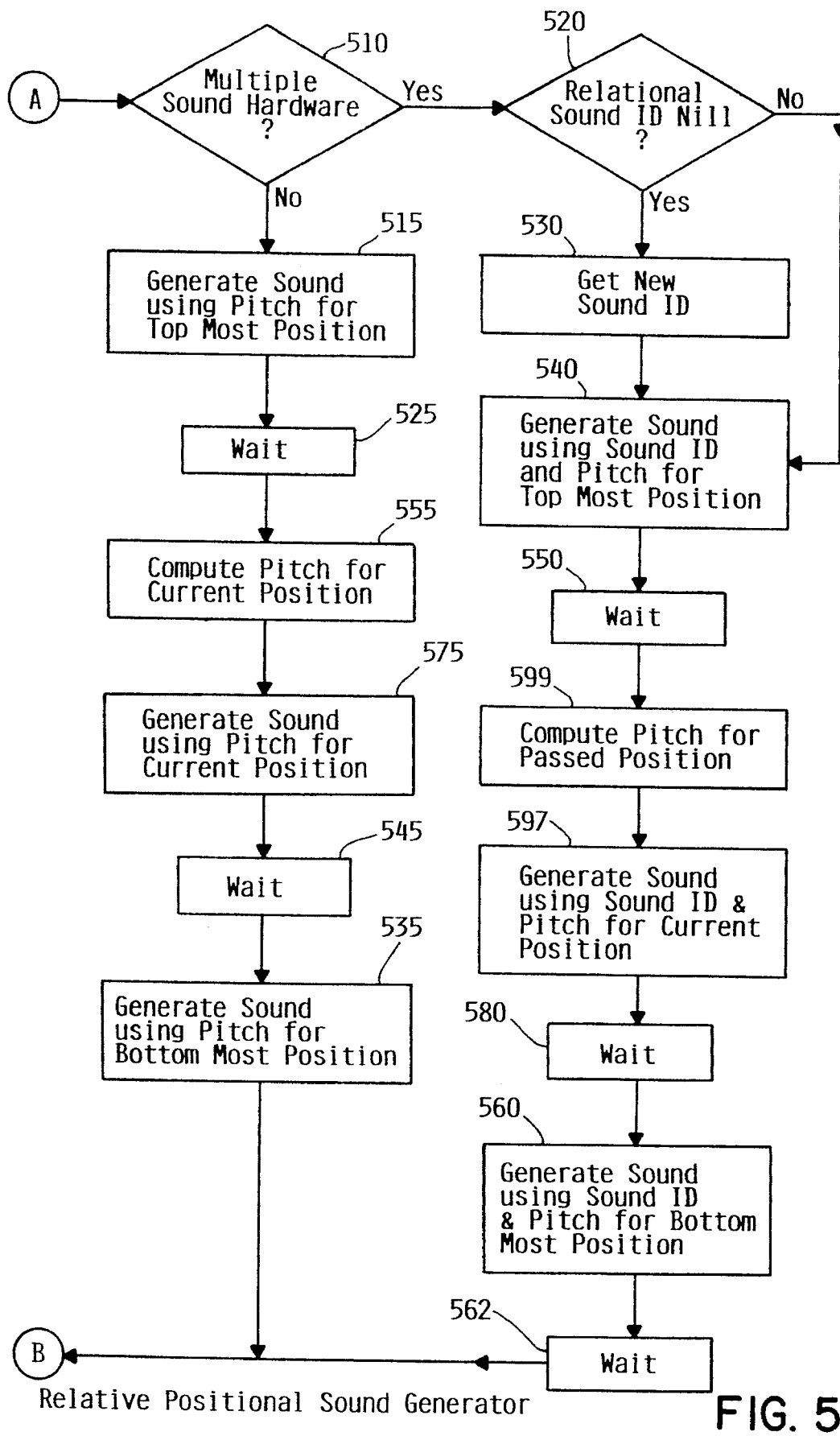

FIG. 5 shows the inner workings of relational positional sound generator 129. RPS 129 begins in block 500 where it determines whether the position finder is ON. RPS 129 determines this by checking the passed event. If the position finder is not ON, RPS 129 proceeds to determine whether the subject computer systems is equipped with multiple sound hardware 505. Since computer system 100 is equipped with multiple sound hardware, RPS 129 next determines whether relational sound ID field 394 of object data record 342 is equal to Nil (block 565). If so, RPS 129 will create a new relational sound ID 570. Regardless of whether there is an existing relational sound ID, RPS 129 will compute the pitch associated with the passed position 585, and instruct sound generator card 140 to emit the appropriate sound 590. RPS 129 then ends and returns control back to the calling program (sound processor 120 in this case) 595.

If in block 500 RPS 129 determines that the position finder is ON, RPS 129 will once again determine whether the subject computer systems is equipped with multiple sound hardware 520. Since computer system 100 is equipped with multiple sound hardware, RPS 129 next determines whether relational sound ID field 394 of object data record 342 is equal to Nil (block 520). If so, RPS 129 will create a new relational sound ID 530. Regardless of whether there is an existing relational sound ID, RPS 129 will instruct sound generator card 140 to emit the pitch associated with the top most line in viewable object 200 (block 540). This is accomplished by reference to top pitch field 364 of object data record 342. RPS 129 will then wait approximately one second 525, compute the pitch associated with the passed position 599, and instruct sound generator card 140 to emit the appropriate sound 597. After waiting another second, RPS 129 will instruct sound generator card 140 to emit the pitch associated with the bottom most position in viewable object 200 (block 560). This is accomplished by reference to bottom pitch field 364 of object data record 342. After waiting one more second 562, RPS 129 then ends and returns control back to the calling program 595 (sound processor 120 in this case).

Referring back to FIG. 4, if in block 402 sound processor 120 determines that the user has selected locational orientation for cursor position changes, sound processor 120 next determines whether LIRs (or additional LIRs) exist in object data record 342 (block 408). As mentioned earlier, LIR stands for "Location Indicator Record." The presence of these records in object data record 342 indicates that either the user has created sound marks within the viewable object or that view regions have automatically been created for the user. If there are no LIRs within object data record 342 or if all of the LIRs within object data record 342 have been investigated, sound processor 120 simply returns control to the invoking program 406 (browse manager 115 in this case). If additional LIRs do exist, sound processor 120 retrieves the next LIR in block 412. Sound processor 120 next checks whether the location indicator type (LIT) found in either field 374 or field 376 of object data block 342 is equal to "ALL" (block 414).

The LIT is a user chosen value that selects the type(s) of LOI(s) that the user wants to be made aware of when moving through the viewable object. Possible values include: "ALL" for all LOIs, "NONE" for no LOIs, "MARK" for sound mark LOIs, and "REGION" for view region LOIs. The user can select a different value for cursor movements and scroll bar movements (See fields 392 and 398 of FIG. 3C). If the retrieved LIT is not equal to "ALL," sound processor 120 next compares it to the LIT stored in the subject LIR (see field 388 of FIG. 3B). If the answer to this question is "NO," sound processor 120 loops back to block 408 and looks for another LIR.

If the retrieved LIT is equal to "ALL" or to the LIT stored in the subject LIR, sound processor 120 determines whether the current position passed in the event indicates that the current position is within the SMA or VRA delineated by the subject LIR. These areas are delineated within the LIR by outer area boundary field 378 and maximal area boundary field 380 of object data record 342. These fields contain the values needed to calculate the subject area. For example, if the SMA or VRA were shaped as a circle, maximal area field 380 would include a specific LOI within viewable object 200 and outer area boundary field 378 would contain a radius. By reference to area shape field 390, and use of the values stored in outer area boundary field 378 and maximal area boundary field 380, sound processor 120 calculates the area encompassed by either the SMA or the VRA and determines whether the current position is within that area 420.

If the current position is not within the calculated area, sound processor 120 next determines whether the subject computer system is equipped with multiple sound hardware. As stated, computer system 100 is equipped with multiple sound hardware. Hence, sound processor 120 next determines whether a sound ID has been set in object data record 342 (see sound ID field 392 of FIG. 3B) 430. Sound IDs are used in multiple sound hardware to identify a particular sound that is to be used. If no sound ID has been set, sound processor 120 loops back to block 408 to look for more LIRs. If a sound ID has been set, sound processor 436 instructs sound generator card 140 to turn the associated sound OFF 436, sets sound ID field 392 to Nil 438, and loops back to block 408 to look for more LIRs 432.

If the current position is within the calculated area, sound processor 120 proceeds to block 418 where it determines whether the current position is on top of a sound mark or within a view region. This is accomplished by reference to LIT field 388 (i.e., to determine whether a sound mark or a view region is involved) and comparison of the current position to the value(s) stored in maximal area boundary field 382. If the passed position is not on top of a sound mark or within a view region, sound processor 120 calculates the intensity of the sound based on the distance between the current position and the sound mark or view region 412. It should be noted that while the preferred embodiment uses a change in volume to represent a change in intensity, any other type of aural intensity change could also be used within the scope of the present invention. If the passed position is on top of a sound mark or within a view region, sound processor 120 sets the intensity level to be the maximal intensity identified in maximum intensity field 382 (block 424).

Regardless of whether the current position is on top of a sound mark or within a view region, sound processor 120 next asks whether the subject computer system is equipped with multiple sound equipment 434. Since computer system 100 does have multiple sound capability, sound processor 120 proceeds to determine whether a sound ID has been set within object data record 342 (block 442). If not, sound processor 120 establishes a new sound and saves the appropriate sound ID in object data record 342. Regardless of whether a sound ID was already set or had to be established, sound processor 120 invokes sound generator 132 and passes it the sound ID as a parameter 450.

Figure 6:
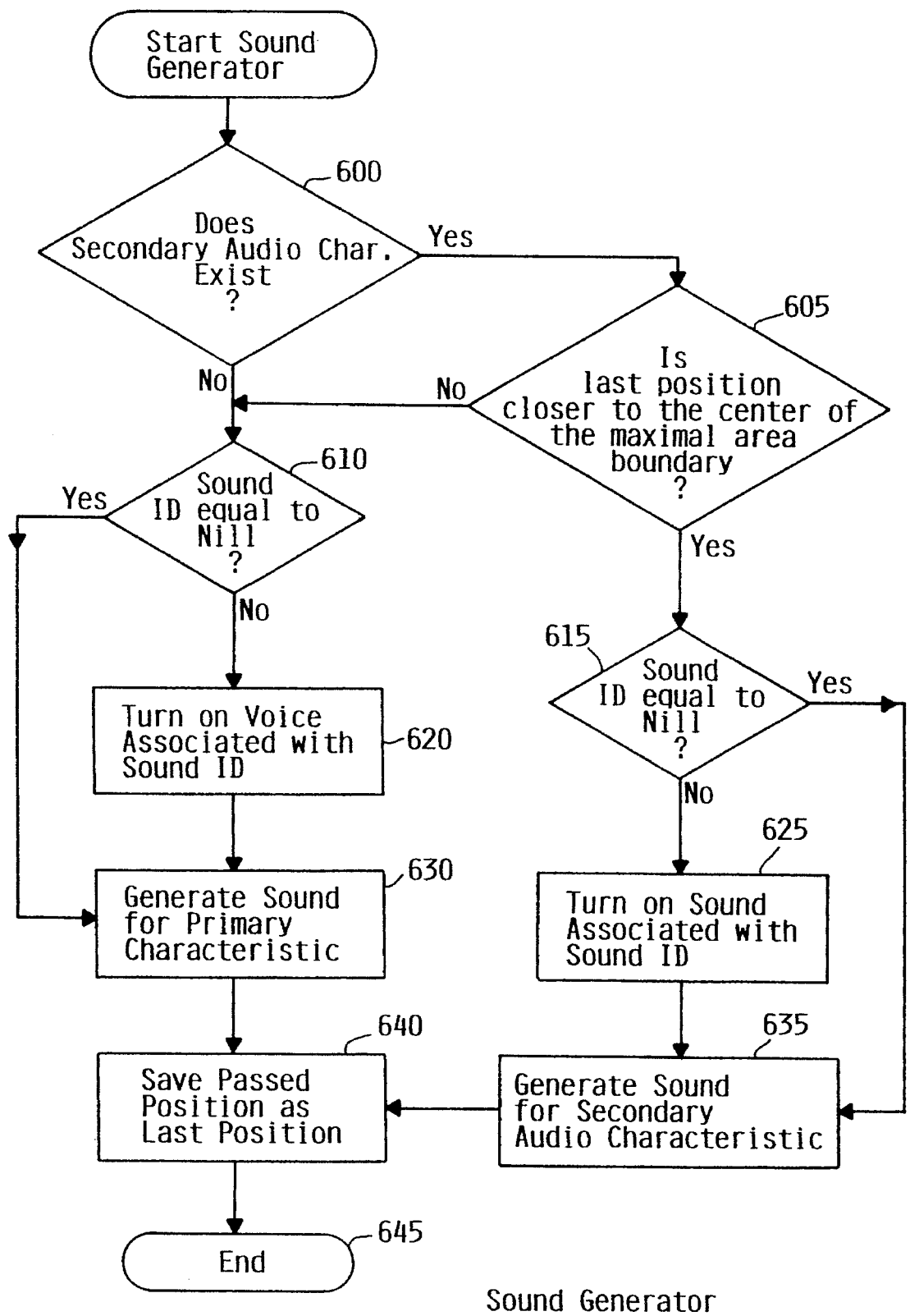
FIG. 6 is a flow diagram that shows the inner workings of the sound generator of the preferred embodiment.

FIG. 6 shows the inner workings of sound generator 132. Sound generator 132 first determines whether a secondary audio characteristic has been set in the subject LIR (block 600). The secondary audio characteristic is used in the present invention to inform the user that he or she is moving the position identifier away from the sound mark or center of the view region. When the user is moving the position identifier away from the sound mark or center of the view region, sound generator 132 instructs sound generator card 140 to emit a different sound. The use of a secondary audio characteristic is particularly valuable when a user is in a large view region since a decrease in intensity will not occur until the user moves the position identifier out of the view region.

If sound generator 132 determines that a secondary audio characteristic does exist within the LIR, it determines whether the position identified in last position field 352 is closer to the center of the maximal area boundary than the current position 605. If not, sound generator 132 proceeds to instruct sound generator card 140 to emit the appropriate sound for the primary audio characteristic (see primary audio characteristic field 384 of FIG. 3B and blocks 610, 620, and 630 of this figure). If the position identified in last position field 352 is closer to the center of the maximal area boundary than the passed position, sound generator 132 proceeds to instruct sound generator card 140 to emit the appropriate sound for the secondary audio characteristic (see secondary audio characteristic field 386 of FIG. 3B and blocks 610, 620, and 630 of this figure). When this is accomplished, sound generator 132 saves the current position into last position field 352 of object data record 342. Sound generator 132 then returns control to sound processor 120.

Sound processor 120 then loops back to block 408 and repeats the process until no more LIRs exist within object data record 342.

Referring back to FIG. 3A, assume for the purposes of the following example that the user who is looking at viewable object 200 has caused a scroll bar event to occur. As with the previous cursor event example, browse manager 115 will get the window event in block 310. Browse manager 115 will then detect that the window event is a scroll bar event 330, move the slider to the position indicated in the scroll bar event 332, and invoke scroll processor 125 with the window event as a passed parameter.

Figure 7A:
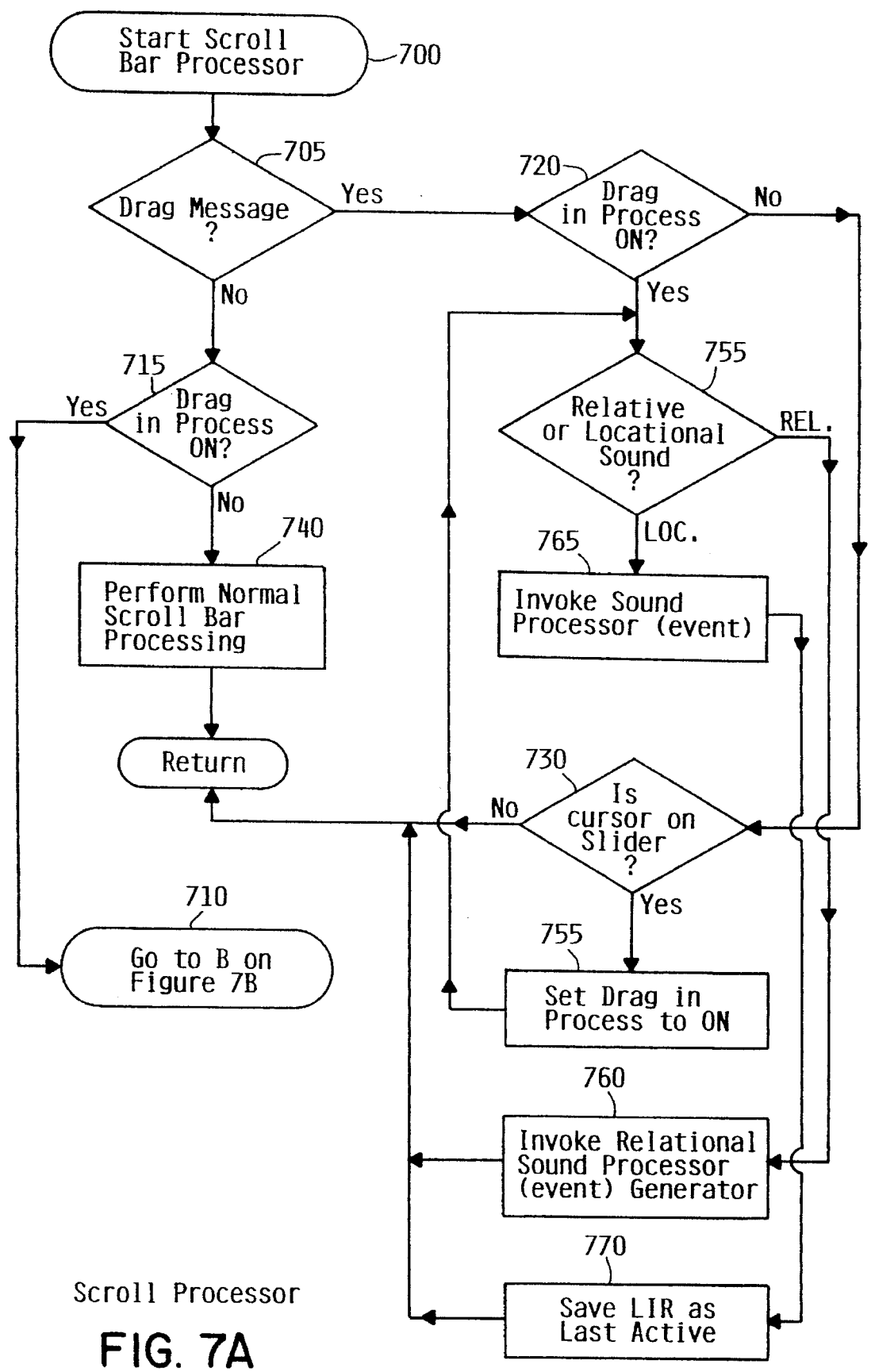
FIGS. 7A and 7B are flow diagrams that show the inner workings of the scroll processor of the preferred embodiment.
Figure 7B:
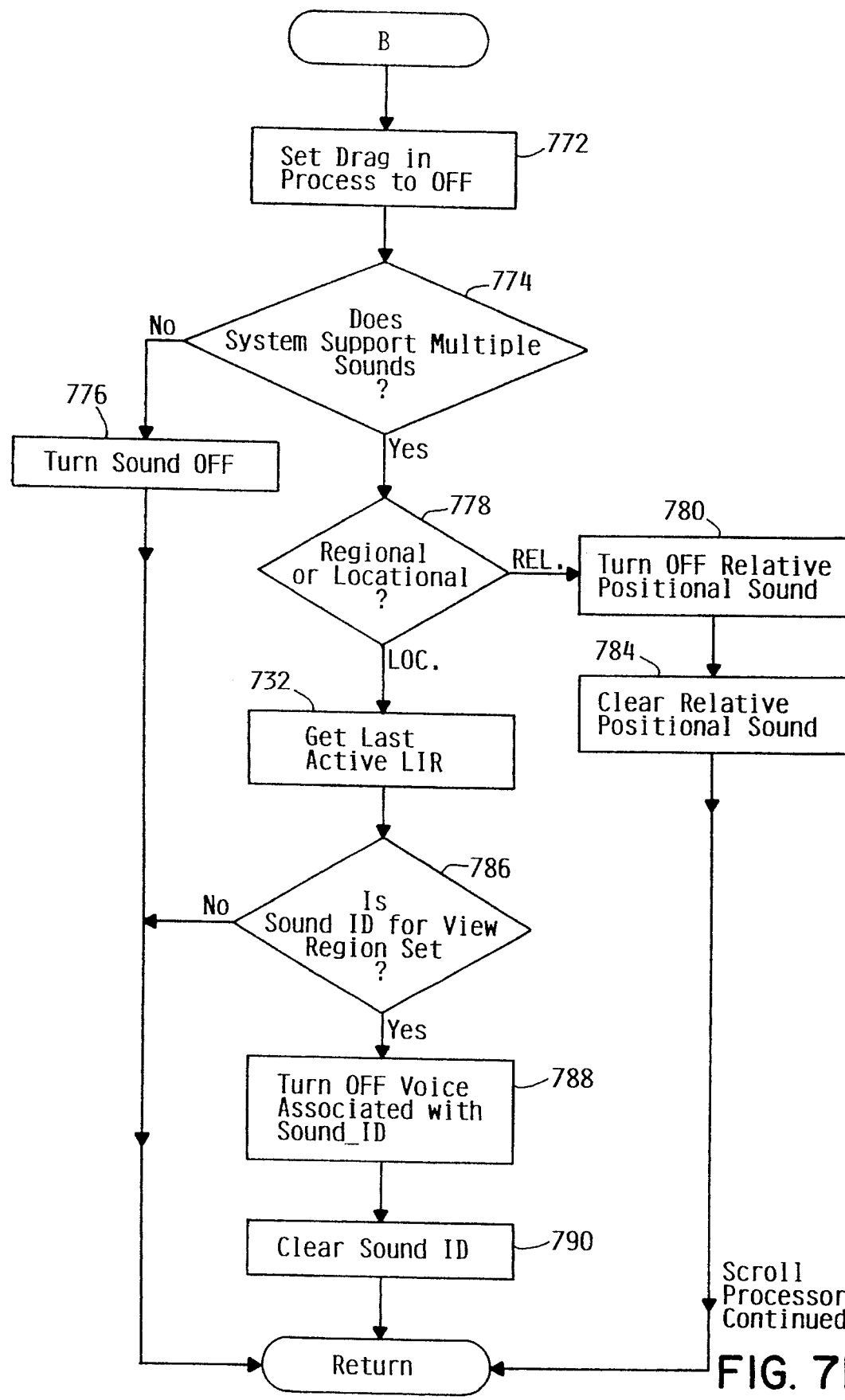

FIG. 7A shows the inner workings of scroll processor 125 in detail. Once invoked, scroll processor 125 determines whether the passed event is a drag event 705. If the event is a drag event, it means that the user is attempting to drag the slider up or down on the scroll bar. If this is the case, scroll processor 120 next determines whether this is the first drag event or one in a series of drag events. If this is the first drag event, drag in process field 348 of object data record 342 will contain a logical zero. If this is one in a series of drag events, drag in process field 348 of object data record 342 will contain a logical one. Scroll processor 125 makes this determination in block 720. If graphical pointing device 165 is on top of the slider, scroll processor 125 knows that it needs to set drag in process field 348 of object data record 342 to logical one (blocks 730 and 750). If graphical pointing device 165 is not on top of the slider, scroll processor 125 knows that the user has failed in the attempt to drag the slider and has generated a spurious event 730. If this is the case, scroll processor 125 returns control back to browse manager 115.

Regardless of whether drag in process field 348 of object data record 342 was determined to be a logical one in block 720, scroll processor 125 will eventually need to determine whether the user has chosen relational or locational orientation 755. If the user has chosen relational orientation (as determined by scroll orientation field 372), scroll processor 125 proceeds to invoke RPS 129 (block 760), and upon return of RPS 129, return control to browse manager 115. If the user has chosen locational orientation, scroll processor 125 proceeds to invoke sound processor 120, and upon return of sound processor 120, return control to browse manager 115. See the text associated with FIG. 5 for a detailed explanation of the inner workings of RPS 129 and the text associated with FIG. 4 for a detailed explanation of sound processor 120.

If, in block 705, scroll processor 125 determines that the passed event is not a drag event, it proceeds to determine whether drag in process field 348 of object data record 342 contains a logical one 715. If not, scroll processor 125 goes ahead and performs whatever processing is appropriate for that event 740, and then returns control to browse manager 115. If drag in process field 348 of object data record 342 is determined to be a logical one, scroll processor 125 sets drag in process field 348 of object data record 342 to logical zero 772 and then determines whether the subject computer system is equipped with multiple sound hardware 774. Since computer system 100 is equipped with multiple sound hardware, scroll processor 125 must determine which sound to turn OFF. To do so, it first determines whether the user has chosen relational or locational orientation 778. If the user has chosen relational orientation, scroll processor 125 proceeds to instruct sound generator card 140 to turn OFF the sound associated with relational sound ID 394 of object data record 342 (block 780), clear relational sound ID 394 of object data record 342 (block 784), and return control to browse manager 115. If the user has chosen locational orientation, scroll processor 125 proceeds to get the last active LIR (as determined by last active LIR field 368) and determine whether sound ID field 392 has been set. If it has not, there is no sound currently being emitted for that LIR. Hence, scroll processor 125 returns control to browse manager 115 immediately. If sound ID field 392 has been set, scroll processor 125 instructs sound generator card 140 to turn OFF the sound associated with sound ID 392 of object data record 342 (block 788), clear sound ID 392 of object data record 342 (block 790), and return control to browse manager 115.

Figure 8:
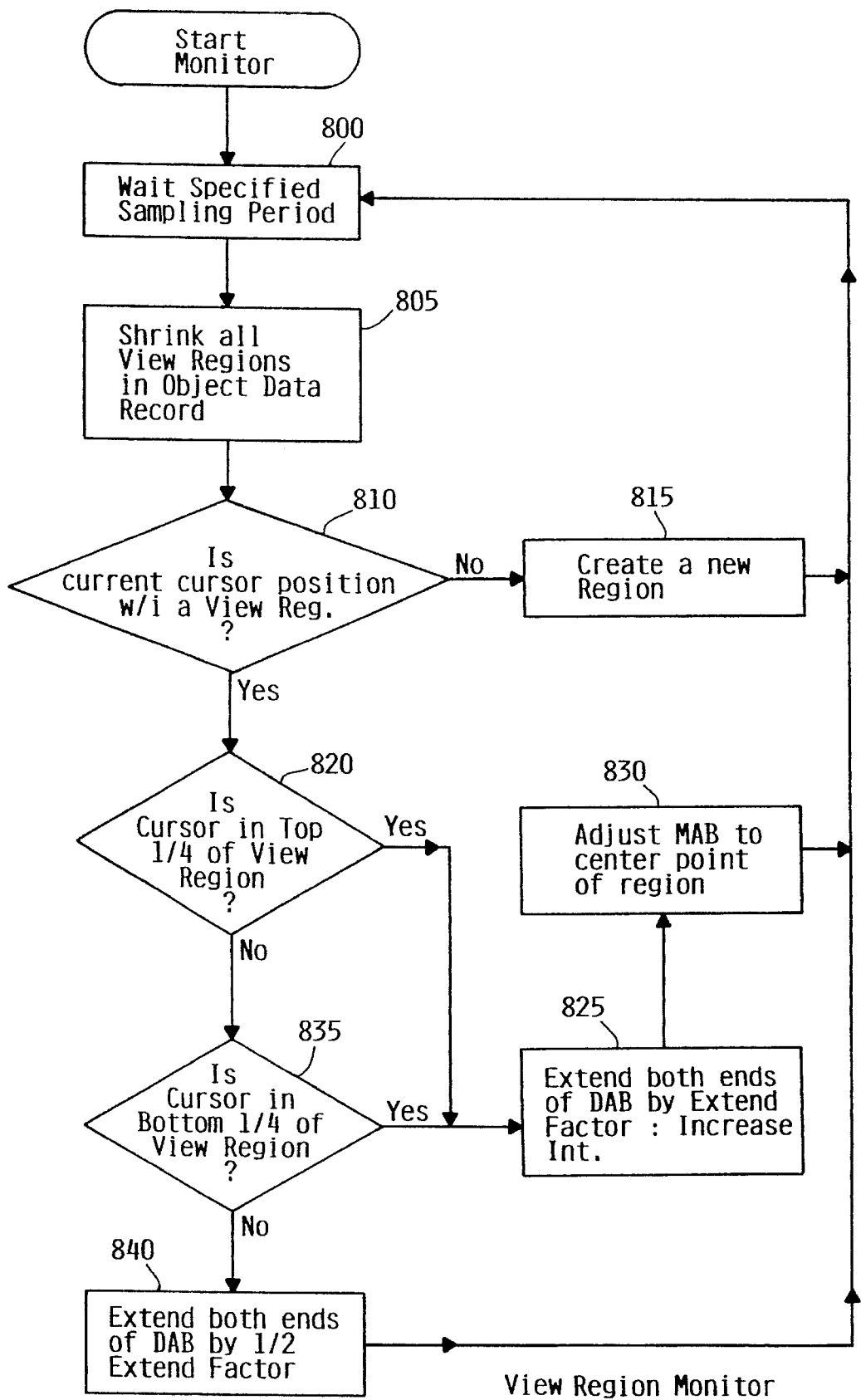
FIG. 8 is a flow diagram that shows the inner workings of the area monitor of the preferred embodiment.

As mentioned above, view regions and VRAs are automatically created, adjusted, and deleted to reflect the user's use of a particular portion of the viewable object. In addition, VRAs are dynamically expanded and contracted to accommodate changes in the degree of use of the particular portion of the viewable object that is represented by the subject view region. This is accomplished by view region monitor 127. FIG. 8 shows the inner workings of view region monitor 127. After view region monitor 127 is started by browse manager 115 (see the discussion of FIG. 3A's block 308 above), view region monitor 127 waits the specified sampling period (as defined in sampling period field 358 of object data record 342) 800 and then proceeds to shrink all of the view regions identified by LIRs in object data record 342 by one half of the reduction factor identified in reduction factor field 356 of object data record 342. View region monitor 127 next determines whether the current position, as identified by current position field 350 of object data record 342, is within a view region. This is accomplished by investigating all of the LIRs in object data record 342 (block 810). If view region monitor 127 determines that the current position is not within a view region, it creates a new view region 815 and returns to block 800 where it again waits for the specified sampling period. When a new view region is created, a representative LIR is also created and placed into the object data record for the viewable object. As mentioned, while the preferred embodiment uses rectangles to represent view regions and VRAs, most any geometric shape could be used (e.g., circles, triangles, squares, etc.). If view region monitor 127 determines that the current position is within a view region, view region monitor 127 next determines whether the current position is within either the top one fourth or bottom one fourth of the subject view region. If so, view region monitor 127 proceeds to extend the outer area boundary of the subject LIR by the extend factor contained in extend factor field 354 (block 825). View region monitor 127 also increases the maximal intensity and adjusts the subject maximal region boundary to the new center point of the view region 830. View region monitor 127 then loops back to block 800. If the current position is neither within the top one fourth or bottom one fourth of the subject view region, view region monitor 127 proceeds to extend the outer area boundary of the subject LIR by one half the extend factor contained in extend factor field 354 (block 840). View region monitor 127 then loops back to block 800.

Although a specific embodiment along with certain alternate embodiments have been disclosed, it will be understood by those skilled in the art that additional variations in form and detail may be made within the scope of the following claims.

What is claimed is:

1. A method for identifying a location of interest within a viewable object, said method comprising the steps of:

marking said location of interest within said viewable object;

moving a position identifier within said viewable object; and emitting a sound that indicates distance between said position identifier and said location of interest.

2. The method of claim 1 wherein said marking step comprises the step of creating a sound mark within said viewable object.

3. The method of claim 1 wherein said marking step comprises the step of automatically creating a view region and a view region area within said viewable object.

4. The method of claim 1 wherein said emitting step comprises the steps of:

changing said sound as said position identifier approaches said location of interest; and changing said sound as said position identifier moves away from said location of interest.

5. A method for identifying a location of interest within a viewable object said method comprising the steps of:

marking said location of interest within said viewable object;

presenting different views of said viewable object to a user, said different views being presented based on a current position of a position identifier within said viewable object; and emitting a sound that indicates distance between said current position and said location of interest.

6. The method of claim 5 wherein said marking step comprises the step of creating a sound mark within said viewable object.

7. The method of claim 5 wherein said marking step comprises the step of automatically creating a view region and a view region area within said viewable object.

8. The method of claim 5 wherein said emitting step comprises the step of:

changing said sound based on said distance between said current position and said location of interest.

9. A method for identifying a location of interest within a viewable object, said method comprising the steps of:

marking said location of interest within said viewable object;

moving a scroll bar to present different views of said viewable object to a user, said different views representing different positions within said viewable object; and emitting a sound that indicates distance between a current position and said location of interest.

10. The method of claim 9 wherein said marking step comprises the step of creating a sound mark within said viewable object.

11. The method of claim 9 wherein said marking step comprises the step of automatically creating a view region and a view region area within said viewable object.

12. The method of claim 9 wherein said emitting step comprises the step of:

changing said sound based on said distance between said current position and said location of interest.

13. A method for providing relational orientation information to a user about a current position of a position identifier within a viewable object, said viewable object having a top and a bottom, said current position being in between said top of said viewable object and said bottom of said viewable object, said method comprising the steps of:

turning on a position finder;

emitting a sound at a first pitch, said first pitch identifying said top of said viewable object;

emitting said sound at a second pitch, said second pitch identifying said current position of said position identifier;

emitting said sound at a third pitch, said third pitch identifying said bottom of said viewable object.

14. A method for identifying a location of interest within a viewable object, said method comprising the steps of:

automatically creating a view region and an associated view region area based a user's use of a portion of said viewable object, said view region being used to help a user understand distance between said location of interest and a current position of a position identifier, said view region area having a size;

automatically adjusting said size of said view region area to reflect changes in the use of said portion of said viewable object; and migrating said view region to the center of said view region area whenever said view region area is adjusted in said automatically adjusting step.

15. An apparatus for identifying a location of interest within a viewable object, said apparatus comprising:

means for marking said location of interest within said viewable object;

means for moving a position identifier within said viewable object; and means for emitting a sound that indicates distance between said position identifier and said location of interest.

16. The apparatus of claim 15 wherein said means for marking comprises means for creating a sound mark within said viewable object.

17. The apparatus of claim 15 wherein said means for marking comprises means for automatically creating a view region and a view region area within said viewable object.

18. The apparatus of claim 15 wherein said means for emitting comprises:

means for changing said sound as said position identifier approaches said location of interest; and means for changing said sound as said position identifier moves away from said location of interest.

19. An apparatus for identifying a location of interest within a viewable object, said apparatus comprising:

means for marking said location of interest within said viewable object;

means for presenting different views of said viewable object to a user, said different views being presented based on a current position of a position identifier within said viewable object; and means for emitting a sound that indicates distance between said current position and said location of interest.

20. The apparatus of claim 19 wherein said means for marking comprises means for creating a sound mark within said viewable object.

21. The apparatus of claim 19 wherein said means for marking comprises means for automatically creating a view region and a view region area within said viewable object.

22. The apparatus of claim 19 wherein said means for emitting comprises:

means for changing said sound based on said distance between said current position and said location of interest.

23. An apparatus for identifying a location of interest within a viewable object, said apparatus comprising:

means for marking said location of interest within said viewable object;

means for moving a scroll bar to present different views of said viewable object to a user, said different views representing different positions within said viewable object; and means for emitting a sound that indicates distance between a current position and said location of interest.

24. The apparatus of claim 23 wherein said means for marking comprises means for creating a sound mark within said viewable object.

25. The apparatus of claim 23 wherein said means for marking comprises means for automatically creating a view region and a view region area within said viewable object.

26. The apparatus of claim 23 wherein said means for emitting comprises:

means for changing said sound based on said distance between said current position and said location of interest.

27. An apparatus providing relational orientation information to a user about a current portion of a position identifier within a viewable object, said viewable object having a top and a bottom, said current position being in between said top of said viewable object and said bottom of said viewable object, said apparatus comprising:

means for turning on a position finder;

means for emitting a sound at a first pitch, said first pitch identifying said top of said viewable object;

means for emitting said sound at a second pitch, said second pitch identifying a current position of a position identifier;

means for emitting said sound at a third pitch, said third pitch identifying said bottom of said viewable object.

28. An apparatus for identifying a location of interest within a viewable object, said apparatus comprising:

means for automatically creating a view region and an associated view region area based on a user's use of a portion of said viewable object, said view region being used to help a user understand distance between said location of interest and a current position of a position identifier, said view region area having a size;

means for automatically adjusting said size of said view region area to reflect changes in the use of said portion of said viewable object; and means for migrating said view region to the center of said view region area whenever said view region area is adjusted by said means for automatically adjusting.

* * * * *